United States Patent [19]

Nitta

[11] Patent Number: 5,508,814
[45] Date of Patent: Apr. 16, 1996

[54] METHOD FOR TRANSMITTING INDEX INFORMATION IN VIDEO TAPE RECORDER

[75] Inventor: Hajime Nitta, Kanagawa, Japan

[73] Assignee: Sony Corporation, Tokyo, Japan

[21] Appl. No.: 427,473

[22] Filed: Apr. 24, 1995

Related U.S. Application Data

[63] Continuation of Ser. No. 136,721, Oct. 13, 1993, abandoned, which is a continuation of Ser. No. 955,538, Oct. 1, 1992, abandoned.

[30] Foreign Application Priority Data

Oct. 7, 1991 [JP] Japan .................................. 3-285522

[51] Int. Cl.$^6$ ............................. H04N 5/76; H04N 9/79; G11B 5/86
[52] U.S. Cl. .......................... 358/335; 358/311; 360/15
[58] Field of Search ..................... 358/335, 311, 358/310; 360/18, 15, 13, 14.1, 14.2, 14.3; 369/83, 84

[56] References Cited

U.S. PATENT DOCUMENTS

| | | | |
|---|---|---|---|
| 4,485,411 | 11/1984 | Yamamoto | 358/296 |
| 4,802,023 | 1/1989 | Williams | 360/14.3 |
| 4,887,170 | 12/1989 | Tsuchida et al. | 360/15 |
| 4,896,213 | 1/1990 | Kobo et al. | 358/167 |
| 5,063,456 | 11/1991 | Horiuchi et al. | 358/310 |
| 5,126,851 | 6/1992 | Yoshimura et al. | 358/335 |
| 5,132,807 | 7/1992 | Takimoto et al. | 358/335 |
| 5,150,212 | 9/1992 | Han | 358/147 |

*Primary Examiner*—Tommy P. Chin
*Assistant Examiner*—Robert Chevalier
*Attorney, Agent, or Firm*—Pasquale Musacchio; Jerry A. Miller

[57] ABSTRACT

A method for transmitting index information in video tape recorders. During playback, index information which was recorded on a tape is retrieved. This index information is superimposed upon the vertical retrace blanking period of the video signal. transmitting said superimposed signal. When the superimposed signal is received, the index information is retrieved from the superimposed signal. The video signal is then recorded with the index information.

5 Claims, 2 Drawing Sheets

TAPE PATTERN FOR CONSUMER ANALOG HD-VTR

Fig. 3

| ITEM | DATA 1 | DATA 2 | DATA 3 | DATA 4 | |
|---|---|---|---|---|---|
| 00000000 | | | | | NO DATA |
| 00000001 | H1 H2 | M1 M2 | S1 S2 | F1 F2 | TIME CODE (ABSOLUTE ADDRESS) |
| 00000010 | H1 H2 | M1 M2 | S1 S2 | F1 F2 | TIME CODE (RELATIVE ADDRESS) |
| 00000011 | H1 H2 | M1 M2 | S1 S2 | X | RECORD TIME |
| 00000100 | H1 H2 | M1 M2 | S1 S2 | F1 F2 | TOTAL HOURS |
| 00000101 | y1 y2 | m1 m2 | d1 d2 | w1 w2 | DATE |
| 00000110 | C1 C2 | C3 C4 | X | X | CHAPTER NUMBER (4 DIGIT) |
| 00000111 | P1 P2 | P3 P4 | X | X | PROGRAM NUMBER (4 DIGIT) |
| 00001111 | | | | | SOFT |

X : UNSPECIFIED

METHOD FOR TRANSMITTING INDEX INFORMATION IN VIDEO TAPE RECORDER

This is a continuation of application Ser. No. 08/136,721 filed on Oct. 13, 1993, which is abandoned and which is hereby incorporated by reference, which is a continuation of application Ser. No. 07/955,538 filed on Oct. 1, 1992, which is abandoned and which is hereby incorporated by reference.

BACKGROUND

1. Field of the Invention

The present invention relates to a Video Tape Recorder (VTR) having an index area. In particular, this invention relates to a system in which the contents of index are selectively transmitted to other VTRs.

2. Background of the Invention

FIG. 2 illustrates a tape pattern for consumer analogue HD-VTR (High Definition Video Tape Recorder). An index area I is formed between a video signal area V and a audio signal area A in a single segment. Indispensable index information such as time codes, a chapter number and total hours, etc., as shown in an item table of FIG. 3, are recorded in this index area I. However, this index information cannot be copied during the dubbing operation of the analogue HD-VTR. Conventional consumer video tape recorders have only video and audio input and output terminals, thus the information is not copied during a normal dubbing operation. Thus, information such as the chapter number, total hours and etc. is rewritten.

SUMMARY OF THE INVENTION

It is, therefore, an object of the present invention to provide a system for a VTR having an index area, in which the contents of index are selectively transmitted to other VTRs during its dubbing operation.

In one aspect of the present invention, index information recorded on a tape is retrieved when it is played back by a VTR. The retrieved index information is superimposed into a video signal and then transmitted. The superimposed video signals is then received by another VTR and the index information can be retrieved out of the superimposed video signals, so that the index information can be recorded at the another VTR in addition to the video signal.

In accordance with the present invention, when a soft tape is dubbed, the contents of the index can be copied. Therefore, there is no need to rewrite the contents of index.

BRIEF DESCRIPTION OF THE DRAWING

The invention will be more readily understood with reference to the accompanying drawing, wherein:

FIG. 3 shows an example of an index format.

DESCRIPTION OF THE INVENTION

Figure 1:
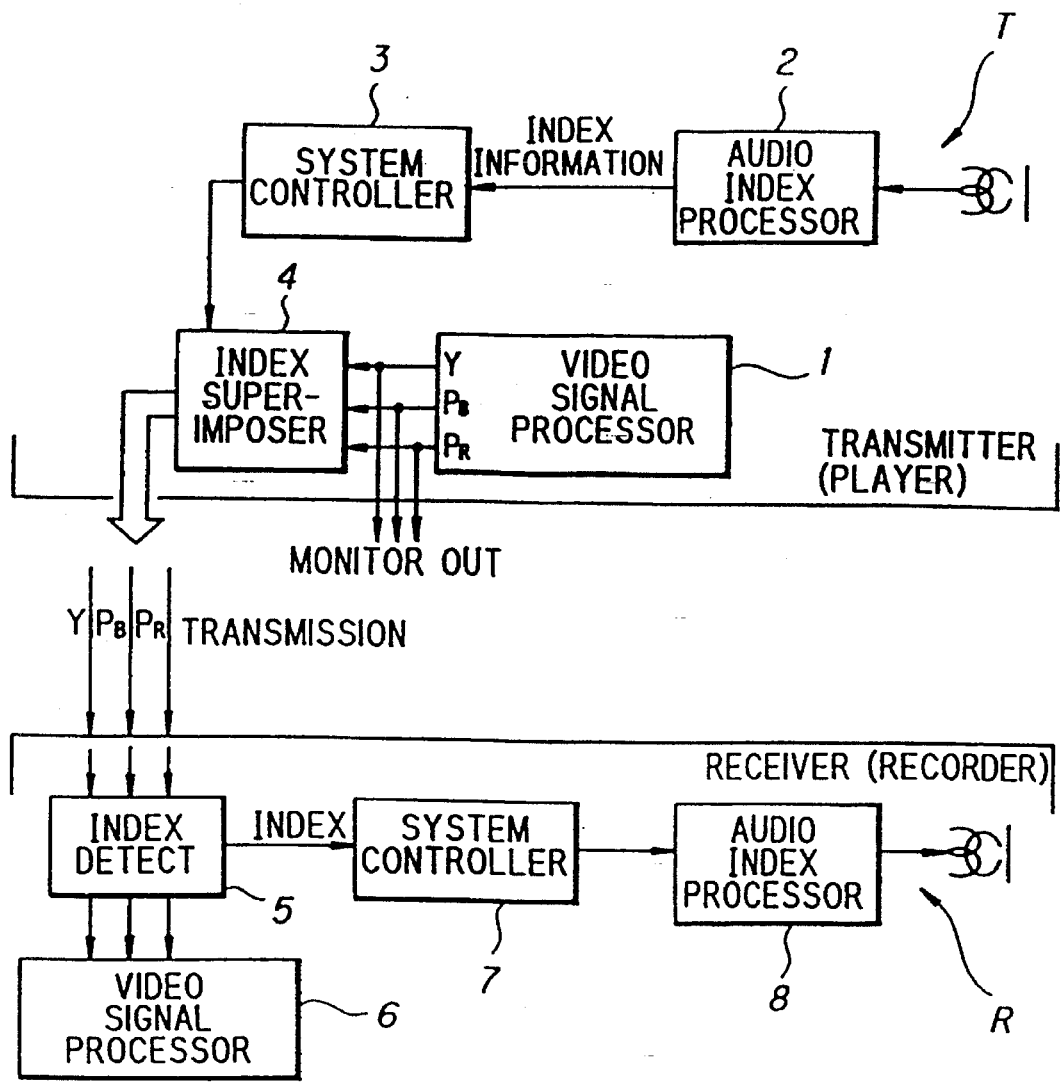
FIG. 1 shows a block circuit diagram for an embodiment of the present invention.
Figure 2:
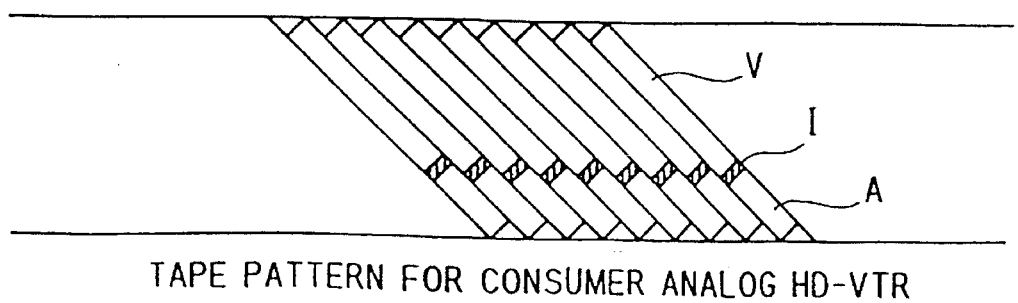
FIG. 2 shows an example of a tape pattern for an analog HD-VTR.

Referring now to FIG. 1, the drawing shows a circuit block diagram of an embodiment of the present invention. In this embodiment, the index signal is superimposed into a vertical retrace blanking interval of a video signal and then transmitted. When a movie soft tape, for example, is played back and transmitted by a conventional transmitter, only audio and video signals are transmitted. However, in this embodiment, as with teletext or character broadcasting for television, the index signal is superimposed into a vertical retrace blanking interval of a video signal and then transmitted.

In FIG. 1, a video signal processing circuit 1 performs signal processing to a video signal played back at a transmitter (or a player) T. In addition, a playback signal, including index information, is supplied to an audio index processor 2. The index can be read out in this processor 2, and the read out index signal is supplied to an index superimposer 4 through a system controller 3. The contents of index information is superimposed as a binary digital signal by this index superimposer 4 into an empty area within a vertical retrace blanking period of a video signal output from the video signal processor 1. Then the superimposed signals are transmitted.

Referring to FIG. 3, index information such as that shown is superimposed upon an empty area of the vertical retrace blanking period. For example, the index information can be superimposed at a period corresponding to 10 horizontal synchronization pulses beginning from the location where the horizontal equalization pulses end. The contents of the index information is superimposed and transmitted as binary digital signals made up of a plurality of bits. In FIG. 3, H M S F means hour, minute, second, frame and Y M D W means year, month, day, and day of the week.

At a receiver (or recorder) R, the index signal can be retrieved by an index detecting circuit 5 from the vertical retrace blanking interval of the received video signal. The video signal itself is supplied from the index detecting circuit 5 to a video signal processor 6. The index information retrieved by the index detecting circuit 5 is then read out by an audio index processor 8 which is controlled by a system controller 7. In addition to the video signal from the video processor 6, the index information can be also recorded. The contents to be copied is selected, at this time, by either one of the transmitter (or a player) T or the receiver (or a recorder) R. It is possible for the conventional television receiver to be affected by the index signal superimposed in the vertical retrace blanking interval. However, this superimposed signal is used only for the dubbing operation. Therefore, an ordinary video signal can be supplied to a monitor output of the VTR.

While specific embodiments of the invention have been shown and disclosed, it is to be understood that numerous changes and modifications may be made by those skilled in the art without departing from the scope and intent of the invention. For example, the index information can be superimposed into a horizontal retrace blanking interval and the transmitted. We may utilize other frequency band than that for analog sound or a digital sound terminal. Further, by providing a digital transmission terminal such as home bus in addition to terminals for video signal and sound signal, a bidirectional transmission can be realized without having any bad effect on signals.

What is claimed is:

1. A method for duplicating a video signal, an audio signal and an associated index information signal, each recorded in a plurality of slant tracks on a source video tape to a corresponding plurality of slant tracks on a target video tape, each of said slant tracks of said source and target video tapes having a video signal area for recording video signals; an index area for recording index information, and an audio signal area for recording audio signals, the method comprising steps of:

tracing said audio signal area, said index signal area and said video signal area of each of said slant tracks on said source tape with a playback head for reproducing, respectively, said audio signal, said index information signal, and said video signal, processing the reproduced index information signal in a first audio signal processor, digitizing the processed, reproduced index information signal, superimposing the digitized index information upon said video signal obtained by said tracing step in a retrace blanking interval of said video signal, transmitting said superimposed index information signal and said signal, receiving said superimposed index information signal and said video signal, separating index information signal from said superimposed index information signal and said video signal, and processing the separated index information signal in a second audio signal processor, recording the separated, processed index information signal on said target video tape in an index area of each slant track on said target video tape.

2. The method of claim 1, wherein said superimposing step includes superimposing said reproduced index information on a vertical retrace blanking period of said video signal.

3. A method for duplicating a video tape, comprising steps of:

providing a source video tape having a video signal recorded in a video signal area, an audio signal recorded in an audio signal area and an index information recorded in an index area of each slant track of the source video tape;

providing a target video tape;

at a playback device:
extracting said video signal, said audio signal and said index information signal from each slant track of said source video tape;

processing the extracted index information signal in a first audio signal processor;

superimposing the processed, extracted index information signal into a vertical retrace blanking period of said video signal;

transmitting said audio signal and said superimposed video and index information signal;

at a recording device:

receiving said audio signal and said superimposed video and index information signal;

separating said index information and said video signal from said superimposed video and index information signal;

processing the separated index information signal in a second audio signal processor, recording said video signal in a video area of each slant track of said target video tape;

recording said audio signal in an audio area of each slant track of said target video tape; and recording said processed index information in an index area of each slant track of said target video tape.

4. A video tape duplicating device for duplicating a source video tape having a video signal recorded in a video signal area, an audio signal recorded in an audio signal area and an index information signal recorded in an index area of each slant track of the source video tape to a target video tape, said device operating in either a recording or a playback mode, the device comprising:

in a playback mode:
means for extracting said video signal, said audio signal and said index information signal from each said slant track of said source video tape;

audio processor means for processing the extracted index information signal;.

means for superimposing the processed index information signal upon said video signal in a retrace blanking interval to produce a superimposed video signal;

means for providing an output of said audio signal and said superimposed video signal;

in a recording mode:
input means for receiving said audio signal and said superimposed video signal;

separating means for separating said index information signal and said video signal from said superimposed video signal;

audio signal means for processing the separated index information signal;

recording means for recording said video signal in a video area of each slant track of said target video tape and for recording said audio signal in an audio area of each slant track said target video tape; and for recording said index information signal in an index area of each slant track of said target video tape.

5. The device of claim 4, wherein said superimposing means superimposes said index information into said vertical retrace blanking period of said video signal.

* * * * *